June 19, 1962   E. W. ONULAK ETAL   3,039,829
PRESS
Filed Nov. 10, 1958
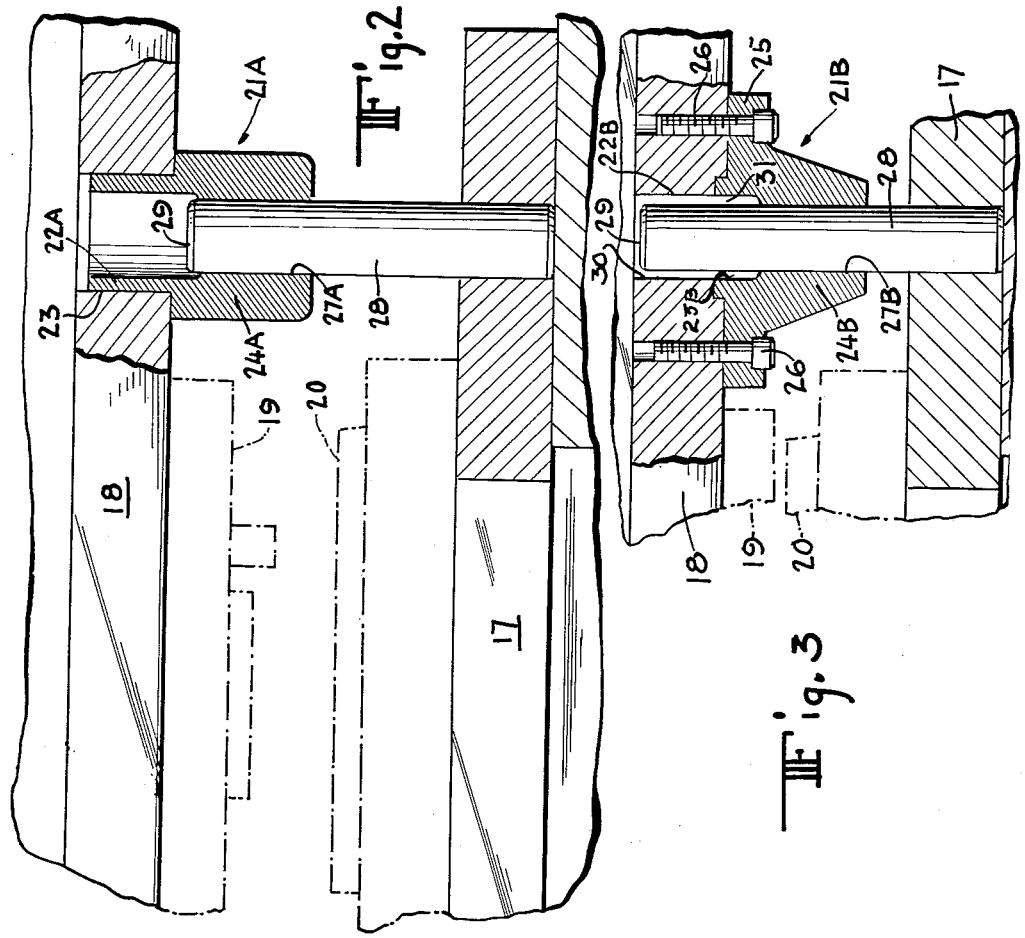
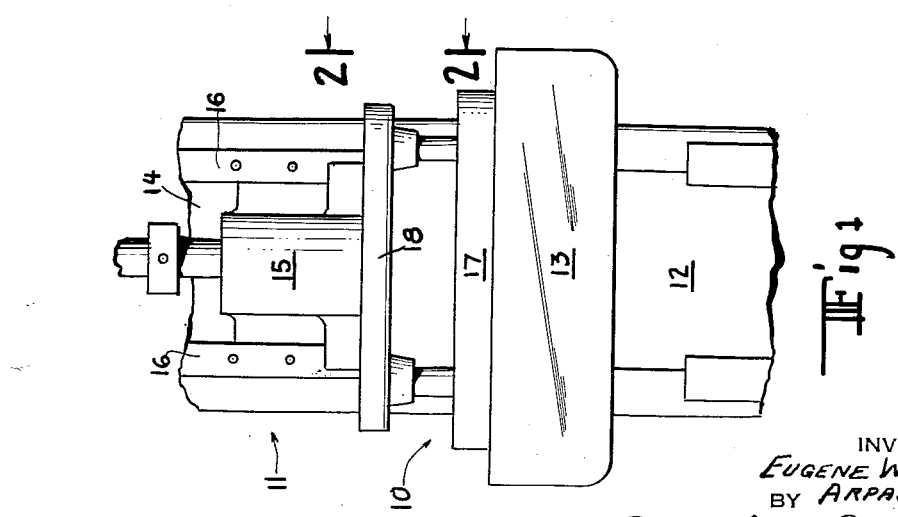
INVENTORS
*EUGENE W. ONULAK*
BY *ARPAD BALAZS*
Pollard Johnston Smyth & Robertson
ATTORNEY

United States Patent Office 3,039,829
Patented June 19, 1962

3,039,829
PRESS
Eugene W. Onulak, Trumbull, Conn., and Arpad Balazs, Huntington, Ind., assignors to The Locke Steel Chain Company, Bridgeport, Conn., a corporation of Connecticut
Filed Nov. 10, 1958, Ser. No. 772,912
5 Claims. (Cl. 308—4)

The present invention relates to die sets, and particularly to a new and improved leader pin and bushing assembly therefor.

The continued operation of die sets during press operations, where the free end of the leader pin moves into the cylindrical bearing in the leader pin bushing, causes bugging or metal pickup to occur which ultimately damages the bearing surface of the bushing and destroys the accuracy of registry between the die set platens.

In many instances, the leader pin may not be capable of being extended beyond the platens when the latter are in a closed cooperating position during a metal working operation.

One of the principal objects of this invention is to provide a die set having a leader pin and bushing assembly that will provide an adequate cylindrical bearing surface for the leader pin throughout the entire working stroke of the movable platen but will prevent sliding engagement between the free end of the leader pin and the cylindrical bearing surface.

Another object of the invention is to provide such an assembly in which the bearing bushing includes a recessed portion of a length greater than the travel of the movable platen during a working operation.

Another object of the invention is to provide such an assembly in which the leader pin is of a constant diameter throughout its effective length and the bushing is provided with a cylindrical bearing of adequate length so arranged relative to the platen on which it is mounted that the free end of the leader pin never enters the bearing when the die set is separated, and preferably does not protrude above the movable platen when the latter is in work forming position relative to the non-movable platen.

In one aspect of the invention, a stationary and movable platen may include two or more leader pin and bushing assemblies, preferably one at each corner of a substantially rectangular platen arrangement. The usual dies may be located between the platens, each fixed to its respective platen for aligned relative, reciprocative motion toward and from each other to produce a die forming operation on stock inserted between the dies. In die forming cooperation the platens are separated an amount slightly greater than the total thickness of the nesting dies in work forming position. This makes it possible to provide a bushing fixed to the movable platen and extending into this space between the platens, within which extension may be provided the cylindrical guide bearing for a cylindrical leader pin mounted on the other platen.

In another aspect of the invention, the portion of the bushing other than that containing the leader pin bearing may be provided with an enlarged cylindrical passage coaxial with the cylindrical bearing within which the free end of the leader pin rides during a metal working operation so that at no time does the free end of the leader pin slide within the confines of the bearing in the bushing.

The above, other objects and novel features of the invention will become apparent from the following specification and accompanying drawing which is merely exemplary.

In the drawing:

FIG. 1 is an elevational view of part of a press including a die set to which the principles of the invention have been applied;

FIG. 2 is an enlarged elevational view taken substantially along line 2—2 of FIG. 1, and showing the die set in separated condition; and FIG. 3 is a view similar to FIG. 2, showing the die set in closed or cooperating position and with a different type of bushing.

Referring to the drawing, the principles of the invention are shown as applied to a die set 10 mounted on a press 11. The press 11 may comprise a base 12 on which may be supported a table or bolster plate 13. A standard 14 may be fixed to the base 12 and it may include a ram 15 adapted to be reciprocated along ways 16 of the standard 14.

The die set 10 may include a bottom platen 17 fixed to the table 13, and an upper platen 18 having a shank connected to the ram 15 in the usual manner. Mating die members 19 and 20 may be mounted between the platens 17 and 18 for performing metal working operations on stock placed therebetween.

Referring to FIGS. 2 and 3, two or more spaced bushings 21A or 21B may be fixed to the platen 18. The bushing 21A of FIG. 2 may include a sleeve portion 22A that is received within a bored hole 23 within the platen 18, and a depending boss 24A that lies between the platens 17 and 18. In FIG. 3 a slightly different form of bushing 21B may have a boss 24B which includes a flange portion 25 through which bolts 26 may pass and thereby fix the bushing 21B to the platen 18. In the bushing shown in FIG. 3, recess 23B and aperture 30 are coaxial with the bearing surface 27B of bushing 21B and preferably of the same diameter.

An accurately formed cylindrical bearing 27A or 27B respectively may be formed in the boss 24A or 24B for receiving an accurately formed leader pin 28 which latter may be rigidly mounted in the platen 17. The bearing 27A or 27B is of sufficient length within the boss 24A or 24B to adequately guide the platens as they are reciprocated relatively toward and from each other during metal working operations.

The internal diameter of the sleeve portion 22A of bushing 21A may be greater than that of the bearing 27A and may extend from the top of the platen 18 to a point within the boss 24A. The internal surface of sleeve 22A may be coaxial with the bearing 27A to thereby provide an annular space between the leader pin and the sleeve 22A throughout the entire relative travel of the leader pin within the bushing 21A. Sleeve 22A extends into bore or aperture 23. Accordingly, at no time during the operation of the die set will the free end 29 of the leader pin 28 slide along the surface of bearing 27A or 27B and, furthermore, when the platens 17 and 18 are in their closed position, the free end 29 of the leader pin does not protrude above the top surface of the platen 18. Similarly, in the form of bushing illustrated in FIG. 3, the internal diameter 22B of the aperture is greater than that of bearing 27B, and the combined length of 22B and recess 31 is similar to that of sleeve 22A. It should be evident that either type of bushing can be employed.

Although the various features of the new and improved die set have been shown and described in detail to fully disclose one embodiment of the invention, it will be evident that numerous changes may be made in such details, and certain features may be used without others without departing from the principles of the invention.

What is claimed is:

1. In a die set, a pair of platens adapted to be reciprocated relatively toward and from each other; leader pin and bushing means for said platens for maintaining them in perfect registry during a metal forming operation, said leader pin having a length greater than the reciprocative stroke of said platens and being cylindrical throughout its entire effective length; a plain bearing surface within said bushing of substantially greater length than the diameter of said leader pin, the entire extent of which is at all times in engagement with said leader pin; and a recess in said bushing coaxial with, and of a greater uniform diameter than said bearing surface and of a length at least slighlty greater than the relative reciprocative movement of said platens, said leader pin extending through said bearing surface and having a free end thereof positioned within said recess during all operative movements of said platens.

2. In a die set, a pair of platens adapted to be reciprocated relatively toward and from each other; a leader pin fixed to one of said platens; a bushing fixed to the other of said platens and including a sleeve portion extending substantially through the platen to which said bushing is fixed, said bushing also including a boss portion adapted to lie between said platens; a cylindrical plain bearing surface within said boss portion for receiving said leader pin; and a recess in said bushing extending throughout the length of said sleeve portion and coaxial with and of greater uniform diameter than said cylindrical bearing surface and of a length at least slightly greater than the relative reciprocative movement of said platens, said leader pin extending through said bearing surface and having a free end thereof positioned within said recess during all operative movements of said platens.

3. In a die set, a pair of platens adapted to be reciprocated relatively toward and from each other; leader pin and bushing assemblies for said platens for maintaining them in perfect registry during a metal forming operation, said leader pin being cylindrical throughout its entire effective length and of a length substantially equal to the overall transverse dimension of the platens in closed relation; a plain bearing surface within said bushing of substantially greater length than the diameter of said leader pin, the entire extent of which is at all times in engagement with said leader pin; and a recess in said bushing coaxial with, and of a greater uniform diameter than said bearing surface and of a length at least slightly greater than the relative reciprocative movement of said platens, said leader pin extending through said bearing surface and having a free end thereof positioned within said recess during all operative movements of said platens.

4. In a die set, a pair of platens adapted to be reciprocated relatively toward and from each other; a leader pin fixed to one of said platens and of a length substantially equal to the overall transverse dimension of the platens in closed relation; a bushing fixed to the other of said platens and including a sleeve portion extending substantially through the platen to which said bushing is fixed, said bushing also including a boss portion adapted to lie between said platens; a cylindrical bearing surface within said boss portion for receiving said leader pin and of substantially greater length than the diameter of said leader pin; and a recess in said bushing extending throughout the length of said sleeve portion and coaxial with and of greater uniform diameter than said cylindrical bearing surface and of a length at least slightly greater than the relative reciprocative movement of said platens, said leader pin extending through said bearing surface and having a free end thereof positioned within said recess during all operative movements of said platens.

5. In a die set, a pair of platens adapted to be reciprocated relatively toward and from each other; a leader pin fixed to one of said platens; a bushing fixed to the other of said platens, said platen to which said bushing is fixed having an aperture therethrough, said bushing also including a boss portion adapted to lie between said platens; a cylindrical bearing surface within said boss portion for receiving said leader pin and of substantially greater length than the diameter of said leader pin; and a recess in said boss matching said aperture, said recess and aperture being coaxial with said cylindrical bearing surface and of a combined length at least slightly greater than the relative reciprocative movement of said platens.

References Cited in the file of this patent

UNITED STATES PATENTS

| | | |
|---|---|---|
| 2,159,901 | Jeune | May 23, 1939 |
| 2,288,136 | Janiszewski | June 30, 1942 |
| 2,322,422 | Danneman | June 22, 1943 |
| 2,523,358 | Conner | Sept. 26, 1950 |
| 2,749,987 | Janiszewski | June 12, 1956 |
| 2,751,260 | Janiszewski | June 19, 1956 |
| 2,756,825 | Janiszewski | July 12, 1956 |
| 2,850,096 | Berlin et al. | Sept. 2, 1958 |